(12) United States Patent
Kojima et al.

(10) Patent No.: US 10,424,984 B2
(45) Date of Patent: Sep. 24, 2019

(54) ROTATING ELECTRICAL MACHINE COIL, PRODUCTION METHOD OF ROTATING ELECTRICAL MACHINE COIL, AND ROTATING ELECTRICAL MACHINE

(71) Applicant: Hitachi, Ltd., Chiyoda-ku, Tokyo (JP)

(72) Inventors: Hiroaki Kojima, Tokyo (JP); Kenji Ikeda, Tokyo (JP); Naohiro Hiruta, Tokyo (JP); Daisuke Kamegawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 569 days.

(21) Appl. No.: 15/073,804

(22) Filed: Mar. 18, 2016

(65) Prior Publication Data

US 2016/0301274 A1 Oct. 13, 2016

(30) Foreign Application Priority Data

Apr. 13, 2015 (JP) ................. 2015-081485

(51) Int. Cl.
*H02K 3/40* (2006.01)
*H02K 3/34* (2006.01)
*H02K 15/10* (2006.01)
*H02K 15/12* (2006.01)

(52) U.S. Cl.
CPC ............. *H02K 3/34* (2013.01); *H02K 15/105* (2013.01); *H02K 15/12* (2013.01)

(58) Field of Classification Search
CPC .. H02K 3/30; H02K 3/34; H02K 3/38; H02K 3/40
See application file for complete search history.

(56) References Cited

U.S. PATENT DOCUMENTS 6,140,733 A * 10/2000 Wedde .................. H02K 3/345
310/196

FOREIGN PATENT DOCUMENTS

| JP | 58-212349 A | 12/1983 |
|----|-------------|---------|
| JP | 2006-325357 A | 11/2006 |
| JP | 2007-200986 A | 8/2007 |
| JP | 2013-66382 A | 4/2013 |

OTHER PUBLICATIONS

Japanese-language Office Action issued in counterpart Japanese Application No. 2015-081485 dated Feb. 5, 2019 with English translation (six (6) pages).

* cited by examiner

*Primary Examiner* — Dang D Le
(74) *Attorney, Agent, or Firm* — Crowell & Moring LLP

(57) ABSTRACT

A rotating electrical machine includes a plurality of coil conductors, and an insulating tape. The insulating tape is wound around the coil conductors a plurality of times to form an insulating layer. The insulating layer corresponds to at least a part of the coil conductors protruded from the core is provided so that a part of the wound insulating tape is adhered.

8 Claims, 11 Drawing Sheets

US 10,424,984 B2

ROTATING ELECTRICAL MACHINE COIL, PRODUCTION METHOD OF ROTATING ELECTRICAL MACHINE COIL, AND ROTATING ELECTRICAL MACHINE

FIELD OF THE INVENTION

The present invention relates to a rotating electrical machine coil suitable for performing impregnation with insulating resin and curing the insulating resin in a state in which the rotating electrical machine coil is received in a core, a production method thereof, and a rotating electrical machine to which the rotating electrical machine coil is applied.

DESCRIPTION OF THE RELATED ART

In rotating electrical machines represented by high-voltage electric motors for a general industry, railways, and the like and high-voltage power generators such as wind power generators, a stator is formed by receiving a stator coil in a slot of a stator core, and the stator core and the stator coil are insulated by performing impregnation with insulating resin after winding an insulating tape around the coil. This configuration is formed by the following methods: a method in which impregnation with resin and curing of the resin are performed at the time of forming a coil of a stator coil and then the coil is received in a core; and a method in which a coil is received in a core and then impregnation with insulating resin and curing of the insulating resin are performed.

Specifically, in the latter method, impregnation with insulating resin is performed in a vacuum state in a state in which the rotating electrical machine coil that has not been impregnated with the insulating resin is provided in the core, and then the insulating resin with which the coil and the core have been impregnated is cured. Therefore, insulation of the rotating electrical machine coil is secured, and the rotating electrical machine coil and the core have no gap.

However, a rotating electrical machine coil around which an insulating tape is wound, which has not been impregnated with insulating resin, has an ununiform bulge in some cases. A bulge of a part received in the core is suppressed by an inner wall or the like of a slot of the core, but a part of the coil protruded outside from the core has a bulge. Therefore, in the case where impregnation with insulating resin and curing of the insulating resin are performed, there is a possibility that a main insulating layer of the part of the coil protruded outside from the core has a void or is peeled off and partial discharge in the main insulating layer occurs.

In order to solve such a problem, JP-A-2013-66382 discloses a production method in which, after a stator coil is received in a stator core, a jig for pressing a part around an end surface in an axial direction of the stator core is inserted, and then an impregnation curing process of insulating resin is performed, and, after the process, the jig is removed.

JP-A-2013-66382 also discloses a method in which a heat shrinkable semiconductivity tape is wound around an outer circumference of a main insulating layer to form a heat shrinkable slot corona protection layer and the heat shrinkable slot corona protection layer is extended to a part protruded outside from the core.

SUMMARY OF THE INVENTION

According to the production method using a jig, which is disclosed in JP-A-2013-66382 described above, it is possible to perform an impregnation curing process of insulating resin while suppressing a bulge of a coil protruded outside from a core. Thus, it is possible to form a main insulating layer with no void or peeling off.

However, in the case of the production method using a jig, it is necessary to arrange the jig in the vicinity of each of both end surfaces of the cores protruded from the cores of the plurality of (normally, several tens or more of) coils of a rotating electrical machine and remove the jig after the impregnation curing process. Thus, it is problematic in that man-hours are remarkably increased and a space for arranging the jig needs to be secured.

Further, in the production method, it is necessary to sufficiently consider not damaging the main insulating layers of the coils in the case where the jigs are removed after the impregnation curing process of the resin is performed, and therefore it is problematic in that automation of work is difficult. It is also problematic in that an insulation property of the main insulating layers is largely changed depending on a skill of a worker.

Also in the method, disclosed in JP-A-2013-66382 described above, in which the heat shrinkable slot corona protection layer is extended to the part protruded outside from the core, it is possible to provide a main insulating layer with no void or peeling off.

However, it is problematic in that the method in which the heat shrinkable slot corona protection layer is extended to the part protruded outside from the core cannot be applied to a rotating electrical machine coil that does not need to have a slot corona protection layer.

In the case where the method is applied to a rotating electrical machine coil having a slot corona protection layer, the slot corona protection layer is formed by winding the heat shrinkable semiconductivity tape, and therefore it is problematic in that variation in sizes of the corona protection layers after the impregnation curing process of the insulating resin is increased due to variation in heat shrinkable amounts.

The invention has been made in view of the circumstances and an object thereof is to provide a rotating electrical machine coil in which an ununiform bulge of the rotating electrical machine coil protruded outside from the core is suppressed without using a jig or remarkably increasing man-hours.

In order to solve the above problems, a rotating electrical machine coil provided by receiving the rotating electrical machine coil in a core of a rotating electrical machine in the invention and performing impregnation with insulating resin and curing of the insulating resin, includes: a plurality of coil conductors; and an insulating tape wound around the coil conductors a plurality of times to form an insulating layer, in which the insulating layer corresponding to at least a part of the coil conductors protruded from the core is provided so that a part of the wound insulating tape is adhered.

Further, a production method of a rotating electrical machine coil received in a core of a rotating electrical machine in the invention, includes: a first winding step for forming an insulating layer by winding an insulating tape around a plurality of coil conductors at least once; and a second winding step for forming an insulating layer by winding the insulating tape around the insulating layer that has been formed in the first winding step and is a layer in which an adhesive member is applied or attached to at least a part protruded from the core.

Furthermore, a rotating electrical machine in the invention, includes: the rotating electrical machine coil; and a rotating electrical machine core in which the rotating electrical machine coil is received, in which the rotating electrical machine coil and the rotating electrical machine core are impregnated with resin.

According to the invention, it is possible to suppress an ununiform bulge of a rotating electrical machine coil protruded outside from a core, and therefore it is possible to form a rotating electrical machine coil having a main insulating layer with no void or peeling off after impregnation with insulating resin and curing of the insulating resin are performed. Accordingly, a rotating electrical machine to which the rotating electrical machine coil is applied can secure high insulation reliability.

Further, an adhesive member is applied or attached during a winding step of an insulating tape to adhere layers of the insulating tape to each other, and therefore it is possible to apply the invention to both an automatic winding step and a manual winding step of an insulating tape without largely changing a conventional production step.

DETAILED DESCRIPTION OF THE INVENTION

Embodiments of the invention will be described in detail below with reference to drawings.

Figure 1:
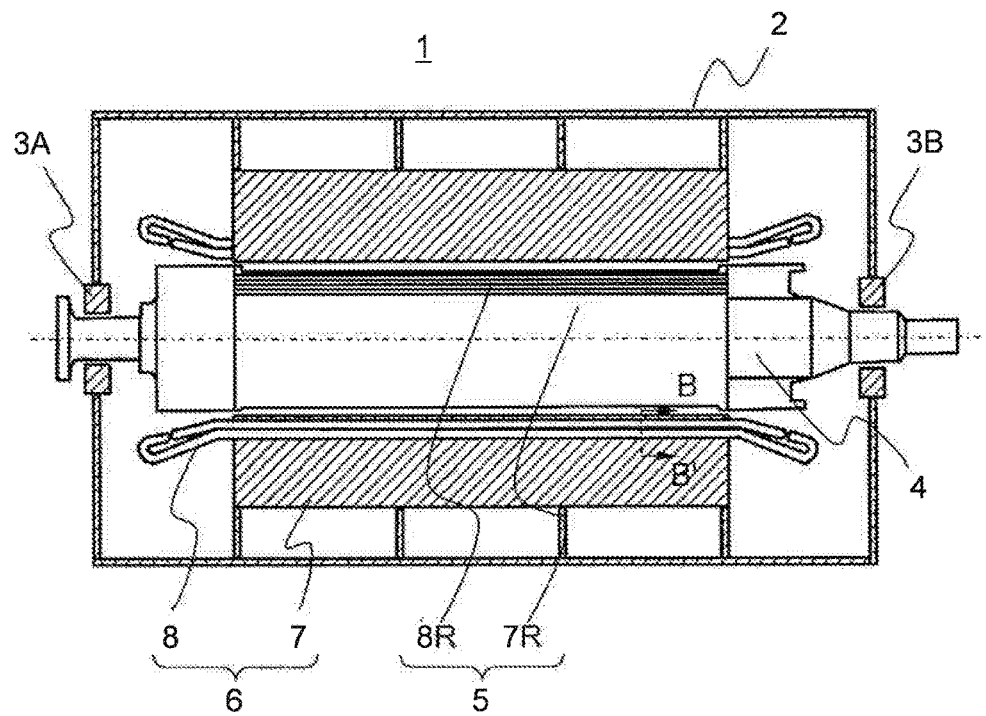
FIG. 1 is a schematic cross-sectional view of a rotating electrical machine in this example.

A configuration of a rotating electrical machine in this example will be described. FIG. 1 is a schematic cross-sectional view of the rotating electrical machine in this example.

A rotating electrical machine 1 includes a housing 2, bearings 3A and 3B pivotally supporting a rotary shaft 4 of a rotor 5 having a magnetic pole, and a stator 6 facing to the rotor 5 so as to have a void in a circumferential direction of the rotor 5.

The rotor 5 includes a rotor core 7R and a rotor coil (winding) 8R provided to a slot of the rotor core 7R.

The stator 6 includes a stator core 7 supported by the housing 2 and a stator coil (winding) 8 provided to the stator core 7.

Note that, in this embodiment, description will be made by using the stator core 7 as a core and the stator coil 8 as a rotating electrical machine coil. However, a technique of this example is also applicable to the rotor 5 including the rotor coil.

Figure 2:
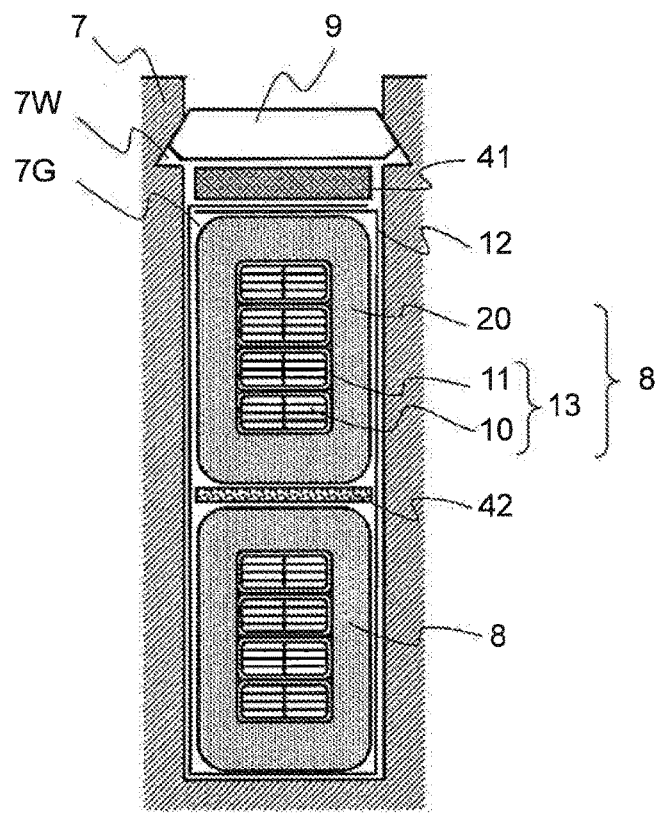
FIG. 2 is a cross-sectional view of a stator slot.

FIG. 2 is a cross-sectional view of a stator slot taken along the line B-B' in FIG. 1.

As illustrated in FIG. 2, in the stator core 7, a plurality of slots (winding grooves) 7G provided from an inner diameter side facing to the rotor 5 toward an outer diameter side over a whole length in a rotary shaft direction of the rotor 5 are formed in the circumferential direction at equal intervals.

Wedge grooves 7W are formed in opening portions of the slots 7G. Then, when wedges 9 are inserted into the wedge grooves 7W, the stator coils 8 provided to the slots 7G are fixed at two upper and lower stages.

In the stator coil 8, a coil conductor 13 is formed by gathering a plurality of wire conductors 10 whose wires have been insulated with the use of a well-known insulating material to form an inter-layer insulating layer 11 made of the well-known insulating material, and a main insulating layer 20 is formed by gathering the plurality of coil conductors 13 and winding a well-known insulating tape 21 (not illustrated) such as a dry mica tape around an outer circumference of the coil conductors 13.

Then, the stator coils 8 are stacked at two upper and lower stages while an intermediate filling 42 made of an insulating material is being inserted therebetween, and, in this state, the stator coils 8 are inserted into the slot 7G of the stator core 7 via an insulation protective layer 12. After the stator coils 8 are inserted, the insulation protective layer 12 is stacked to surround the stator coils 8, and then an under-wedge filling 41 made of an insulating material is stacked thereon, and, after that, the wedge 9 is inserted into the wedge grooves 7W.

The intermediate filling 42 maintains an interval between the upper and lower stator coils 8 so that the interval has a predetermined insulation size.

The stator core 7 into which the stator coils 8 are inserted is received in a vacuum impregnation vessel thereafter, and vacuum pressure impregnation of insulating resin such as epoxy resin is performed with a well-known procedure, and then gaps in outside and inside of each insulating layer and inside of the slot 7G are impregnated with the insulating resin. Thereafter, the insulating resin with which the gaps are impregnated is heated and cured. In this way, it is possible to provide the stator coil 8 having a small number of voids generated in the main insulating layer 20 and having high reliability and a rotating electrical machine to which the stator coil 8 is applied.

A configuration of the stator coil 8 in this example will be described in more detail below.

Example 1

Figure 3:
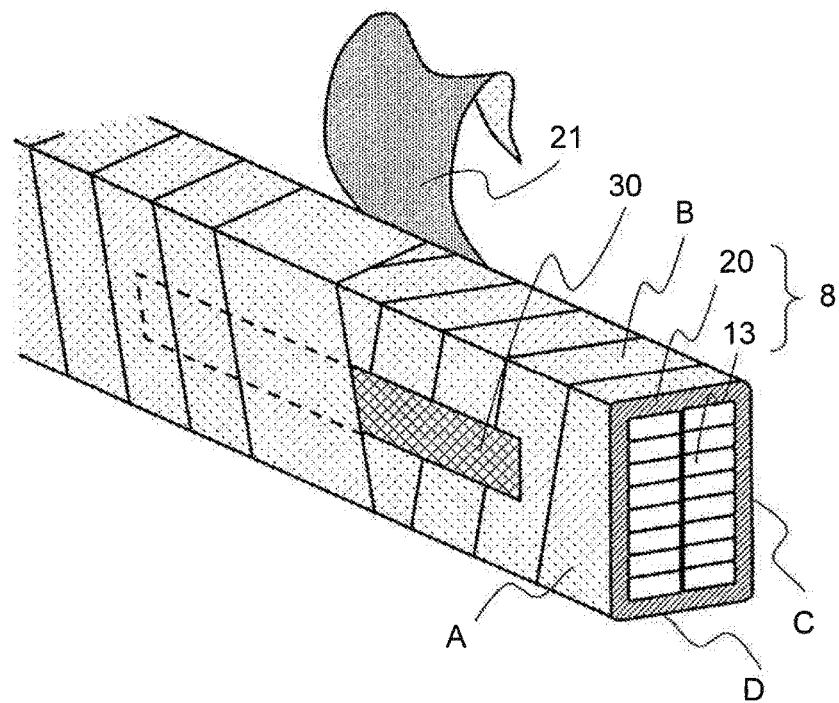
FIG. 3 is a schematic perspective view illustrating progress in which a stator coil in Example 1 is taped with an insulating tape.

FIG. 3 is a schematic perspective view illustrating progress in which the stator coil 8 is taped with the insulating tape 21. The stator coil 8 is formed by gathering the plurality of coil conductors 13 and winding the insulating tape 21 around the outer circumference thereof so that about a half of a tape width is overlapped. This process is repeated a plurality of times, and a plurality of layers in which the insulating tape 21 is wound are formed. Thus, the main insulating layer 20 is formed.

Note that, although the cross section of the stator coil 8 in FIG. 3 (the same applies to FIG. 5 described below) and the cross section of the stator coil 8 in FIG. 2 are drawn to have different shapes, the following point is omitted in FIG. 3: the plurality of wire conductors 10 are gathered and the interlayer insulating layer 11 made of the well-known insulating material is formed, which has been described with reference to FIG. 2.

As illustrated in FIG. 3, the wound insulating tape 21 is adhered by continuously applying or attaching an adhesive member 30 in the longitudinal direction of the stator coil 8 between an inner circumference side of the insulating tape 21 that is being wound and an outer circumference side of the insulating tape 21 that has already been wound. The adhesive member 30 can be an arbitrary adhesive member such as a liquid, gel, semisolid, or solid adhesive member.

At this time, a bulge caused by loose winding of the insulating tape 21 is generated more easily as a side surface of the main insulating layer 20 has a larger area. Therefore, FIG. 3 illustrates an example where the adhesive member 30 is applied or attached to an A surface of the stator coil 8. At this time, when the adhesive member 30 is applied or attached to a C surface to adhere layers of the insulating tape 21 to each other, the bulge of the main insulating layer 20 can be further suppressed.

Moreover, the bulge of the main insulating layer 20 may be further suppressed by applying or attaching the adhesive member 30 to all of A, B, C, and D surfaces of the stator coil 8 and adhering the layers of the insulating tape 21 to each other to prevent loose winding.

Figure 4:
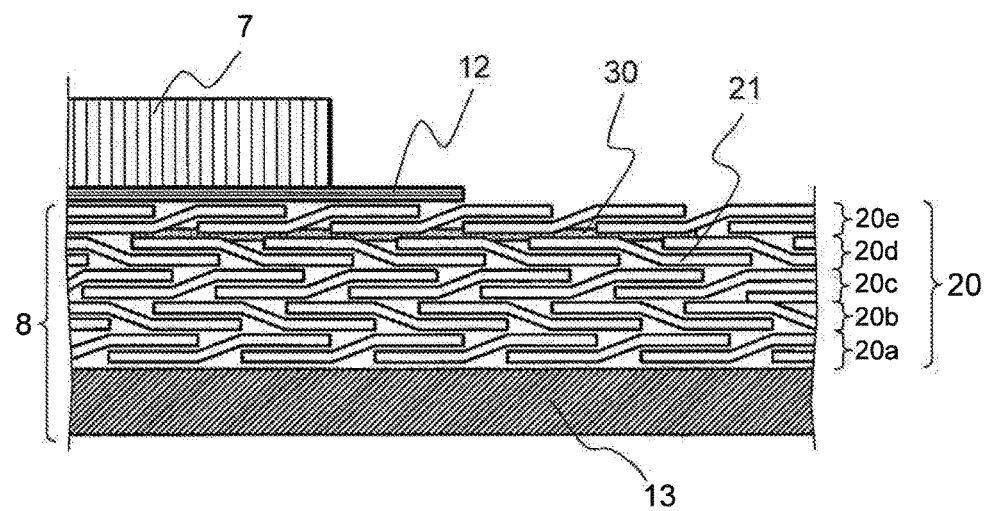
FIG. 4 illustrates a cross section in a longitudinal direction of the stator coil having a main insulating layer in Example 1.

FIG. 4 illustrates a cross section in the longitudinal direction of the stator coil 8 having the main insulating layer 20, which is obtained in the case where the stator coil 8 is received in the slot 7G of the stator core 7.

The main insulating layer 20 is formed by the insulating tape 21 such as a mica tape wound around the outer circumference of the coil conductors 13. Specifically, the main insulating layer 20 has the following five layers: a main insulating layer 20a formed by the insulating tape 21 that is wound from an outward direction to an inward direction of the stator core 7 (right to left on the sheet) in a longitudinal direction of the coil conductors 13 so that about the half of a tape width is overlapped; a main insulating layer 20b formed by the insulating tape 21 that is wound in a direction opposite to that of the main insulating layer 20a; a main insulating layer 20c formed by the insulating tape 21 that is wound in a direction same as that of the main insulating layer 20a; a main insulating layer 20d formed by the insulating tape 21 that is wound in a direction same as that of the main insulating layer 20b; and a main insulating layer 20e formed by the insulating tape 21 that is wound in a direction same as that of the main insulating layer 20a.

Layers of the main insulating layer 20d and the main insulating layer 20e are adhered to each other with the use of the adhesive member 30. At this time, the adhesive member 30 is applied or attached to at least a part of the stator coil 8 protruded from the stator core 7.

With this, a bulge caused by loose winding of the insulating tape 21 is not generated in the main insulating layer 20 of the stator coil 8 that is not restricted by the slot 7G of the stator core 7.

As illustrated in FIG. 4, in the case where the layers of the main insulating layer 20d and the main insulating layer 20e are adhered to each other with the use of the adhesive member 30, loose winding of the insulating tape 21 forming the main insulating layer 20c, the main insulating layer 20b, and the main insulating layer 20a can also be suppressed.

Therefore, it is possible to suppress an ununiform bulge of a rotating electrical machine coil protruded outside from a core by adhering at least one layer on an outer layer side in the main insulating layer 20 formed by winding the insulating tape 21 a plurality of times.

Although FIG. 4 illustrates the cross section obtained when the insulating tape 21 is wound reciprocatively, the adhesive member 30 can also be similarly applied or attached when the insulating tape 21 is wound in one direction.

Further, the number of layers of the main insulating layer 20 formed by winding the insulating tape 21 is not limited to five layers, and the insulating tape 21 only needs to be wound to form at least two layers.

Herein, a production method of the stator coil 8 illustrated in FIG. 3 will be described.

Generally, the stator coil 8 is formed by gathering the plurality of coil conductors 13 and then the insulating tape 21 is wound around the stator coil 8 with the use of a taping machine. Then, in the case where the stator coil 8 is received in the slot 7G of the stator core 7 after the insulating tape 21 is wound a predetermined number of times (to form four layers in FIG. 3), the adhesive member 30 is applied or attached to a part of the stator coil 8 protruded from the stator core 7, and then the insulating tape 21 is further wound to form another layer. Note that application or attachment of the adhesive member 30 may be implemented as a step different from a taping step of the insulating tape 21 or a tool for applying or attaching the adhesive member 30 during taping may be operated.

An application or attachment range of the adhesive member 30 may include not only the part protruded from the stator core 7 when the stator coil 8 is received in the stator core 7 but also the outer circumference side of the insulating tape 21 corresponding to a part received in the slot 7G. In this case, it is possible to prevent a bulge of the main insulating layer 20 in a part from a portion below an end surface of the stator core 7 to a portion protruded therefrom, the part having the greatest influence on an insulate property. Further, in this case, also in the case where the stator coil 8 and the stator core 7 have a large size tolerance, it is possible to securely prevent a bulge of the main insulating layer 20 at the exit portion of the stator core 7. Furthermore, a sufficient tolerance can be provided as a work tolerance at the time of receiving the stator coil 8 in the stator core 7.

Herein, a range of the part protruded from the stator core 7, to which the adhesive member 30 is applied or attached, is a range in which partial discharge does not occur in the main insulating layer 20 and can be appropriately set in accordance with a configuration of the rotating electrical machine.

Figure 5:
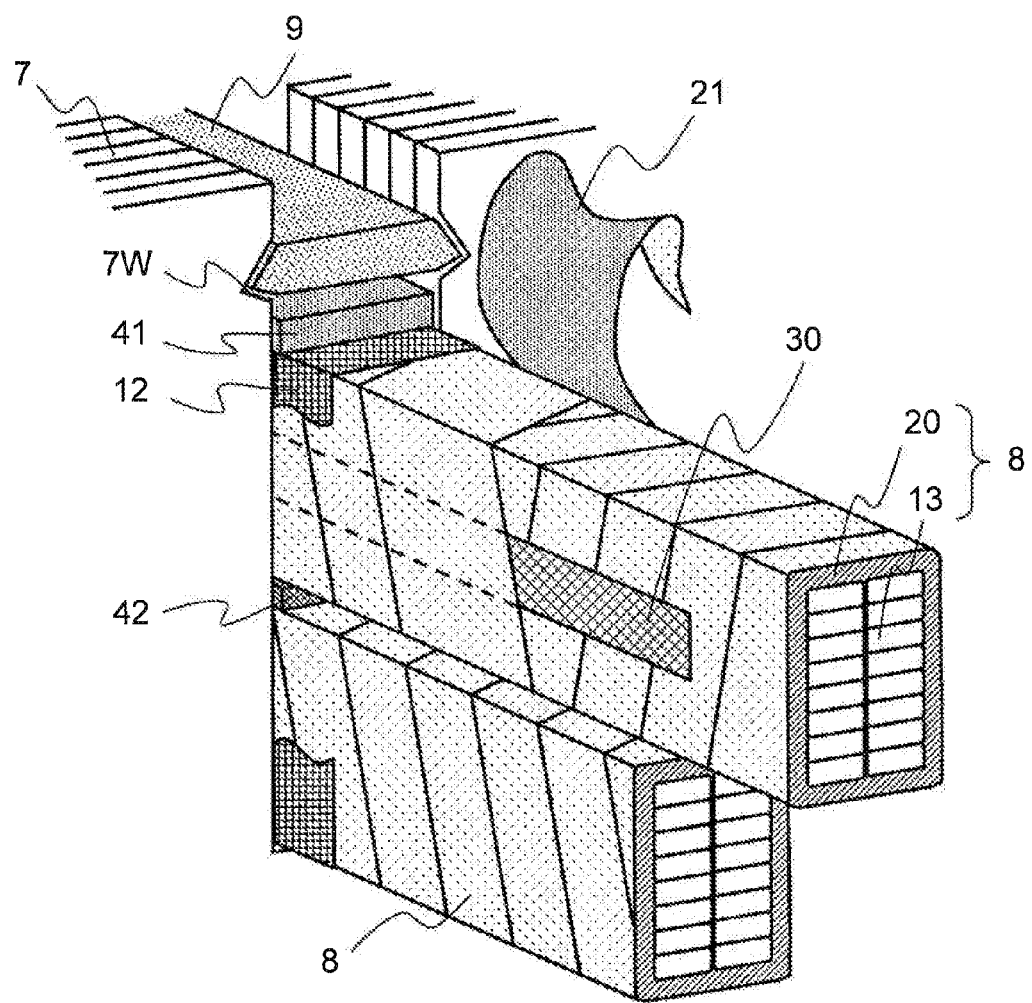
FIG. 5 is a schematic perspective view of and around an exit portion of a stator core receiving the stator coil in Example 1.

FIG. 5 is a schematic perspective view of and around the exit portion of the stator core 7 of the rotating electrical machine receiving the stator coil 8 in this example.

In FIG. 5, a part of the insulation protective layer 12 of the stator coil 8 is illustrated to be cut out. Further, the stator coil 8 illustrated in FIG. 5 is different from an actual device in that the insulating tape 21 is being wound.

As described above, in the stator coil 8, the main insulating layer 20 is formed by winding a plurality of layers of the insulating tape 21 around the outer circumference of the plurality of coil conductors 13. At this time, the adhesive member 30 is continuously applied or attached to at least the part of the stator coil 8 protruded from the stator core 7 in the longitudinal direction, and outer two layers of the insulating tape 21 are adhered to each other with the use of the adhesive member 30.

As described with reference to FIG. 2, the stator coil 8 configured as described above is inserted into the slot 7G of the stator core 7 and is fixed thereto, and, after the stator coils 8 stacked at the two upper and lower stages are inserted into all of the slots 7G of the stator core 7, the stator coils 8 are connected.

Thereafter, gaps in the main insulating layer 20 and the slots 7G are impregnated with insulating resin such as epoxy resin by a vacuum pressure impregnation process or the like and the insulating resin is heated and cured.

With this, impregnation with the insulating resin and curing of the insulating resin are performed while the bulge of the main insulating layer 20 of the stator coil 8 at the exit portion of the stator core 7 is being suppressed. Therefore, it is possible to provide a rotating electrical machine having high insulation reliability.

Example 2

Another example of the configuration of the stator coil 8 will be described with reference to FIG. 6 to FIG. 8. Note that, in FIG. 6 to FIG. 8, the same reference signs as those in FIG. 1 to FIG. 5 denote the same components, and therefore repeated description thereof is omitted in some cases.

In Example 1 described above, the following example has been described: the adhesive member 30 is continuously applied or attached in the longitudinal direction of the coil to the outer circumference of the insulating tape 21 that has already been wound, and the inner circumference of the insulating tape 21 that is being wound is adhered to the outer circumference of the insulating tape 21 that has already been wound. In Example 2, the adhesive members 30 are discontinuously applied or attached in the longitudinal direction of the coil to adhere the wound insulating tape 21.

Description will be made in detail below with reference to the drawings.

Figure 6:
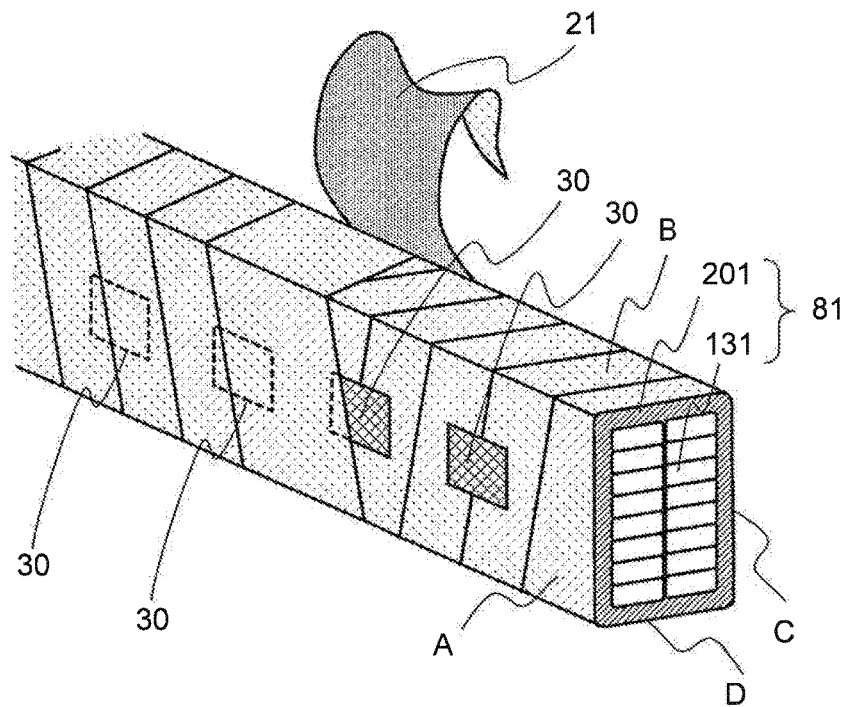
FIG. 6 is a schematic perspective view illustrating progress in which a stator coil in Example 2 is taped with an insulating tape.

FIG. 6 is a schematic perspective view illustrating progress in which a stator coil 81 is taped with the insulating tape 21. The stator coil 81 is formed by gathering a plurality of coil conductors 131 and winding the insulating tape 21 around an outer circumference thereof so that about a half of a tape width is overlapped. This process is repeated a plurality of times, and a plurality of layers in which the insulating tape 21 is wound are formed. Thus, a main insulating layer 201 is formed.

At this time, as illustrated in FIG. 6, the wound insulating tape 21 is adhered by discontinuously applying or attaching the adhesive members 30 in a longitudinal direction of the stator coil 81 between the inner circumference side of the insulating tape 21 that is being wound and an outer circumference side of the insulating tape 21 that has already been wound. The adhesive members 30 can be an arbitrary adhesive member such as a liquid, gel, semisolid, or solid adhesive member.

Intervals at which the adhesive members 30 are applied or attached and areas of the adhesive members 30 are appropriately adjusted in accordance with a bulge amount caused by loose winding of the main insulating layer 201. That is, in the case where the bulge amount is large, the intervals of the adhesive members 30 are reduced, or the areas of the adhesive members 30 are increased to increase an adhesive strength.

Further, as in Example 1, a surface to which the adhesive members 30 are applied or attached can be selected in accordance with an area of a side surface of the main insulating layer 201 in which loose winding of the insulating tape 21 is large. FIG. 6 illustrates an example where the adhesive members 30 are applied or attached to an A surface of the stator coil 81. However, the adhesive members 30 may be applied or attached to a C surface. Further, the adhesive members 30 may be applied or attached to both the A surface and the C surface. Moreover, a bulge of the main insulating layer 201 caused by loose winding of the insulating tape 21 may be further suppressed by applying or attaching the adhesive members 30 to all of A, B, C, and D surfaces of the stator coil 81 and adhering the layers of the insulating tape 21 to each other.

Figure 7:
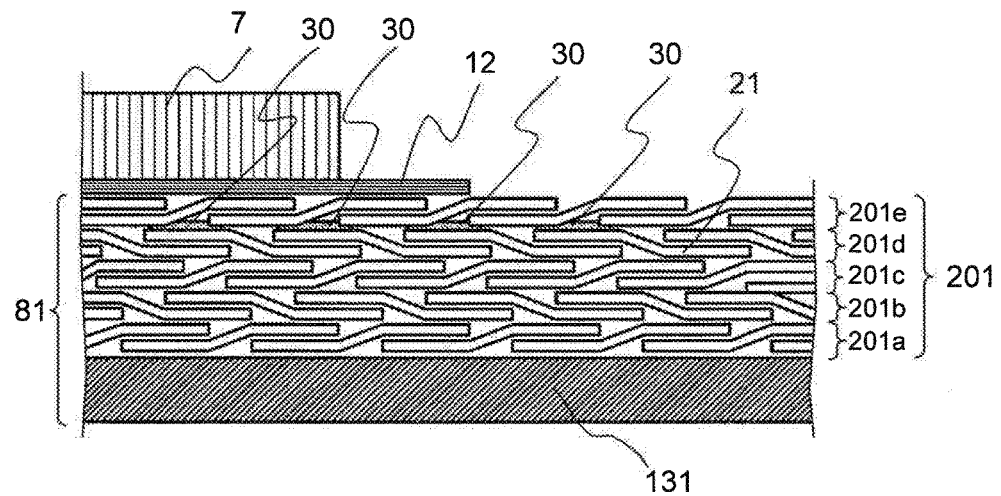
FIG. 7 illustrates a cross section in a longitudinal direction of the stator coil having a main insulating layer in Example 2.

FIG. 7 illustrates a cross section in the longitudinal direction of the stator coil 81 having the main insulating layer 201, which is obtained in the case where the stator coil 81 is received in the slot 7G of the stator core 7.

The main insulating layer 201 is formed by the insulating tape 21 such as a mica tape wound around the outer circumference of the coil conductors 131. Specifically, the main insulating layer 201 having five layers of a main insulating layer 201a, a main insulating layer 201b, a main insulating layer 201c, a main insulating layer 201d, and a main insulating layer 201e is formed by winding the insulating tape 21 five times in the same way as Example 1.

The layers of the main insulating layer 201d and the main insulating layer 201e are adhered to each other with the use of the adhesive member 30. At this time, the adhesive member 30 is applied or attached to at least a part of the stator coil 81 protruded from the stator core 7.

With this, a bulge caused by loose winding of the insulating tape 21 is not generated in the main insulating layer 201 of the stator coil 8 that is not restricted by the slot 7G of the stator core 7.

In this example as well as in Example 1, it is possible to suppress an ununiform bulge caused by loose winding of the insulating tape 21 of the rotating electrical machine coil protruded outside from the core by adhering at least one layer on an outer layer side in the main insulating layer 201 formed by winding the insulating tape 21 a plurality of times.

Further, as in this example, the adhesive members 30 are discontinuously applied or attached in the longitudinal direction of the stator coil 81 to adhere the wound insulating tape 21. Therefore, a use amount of the adhesive member 30 can be reduced and cost reduction can be achieved, as compared with Example 1.

Herein, a production method of the stator coil 81 illustrated in FIG. 6 will be described.

The stator coil 81 is formed by gathering the plurality of coil conductors 131 and then the insulating tape 21 is wound around the stator coil 81 with the use of a taping machine. Then, in the case where the stator coil 81 is received in the slot 7G of the stator core 7 after the insulating tape 21 is wound a predetermined number of times (four layers in FIG. 6), the adhesive member 30 is applied or attached to a part of the stator coil 81 protruded from the stator core 7, and then the insulating tape 21 is further wound to form another layer. Note that application or attachment of the adhesive member 30 may be implemented as a step different from a taping step of the insulating tape 21 or a tool for applying or attaching the adhesive member 30 during taping may be operated.

As in Example 1 described above, the application or attachment range of the adhesive member 30 may include not only the part protruded from the stator core 7 when the stator coil 81 is received in the stator core 7 but also the outer circumference side of the insulating tape 21 corresponding to a part received in the slot 7G.

Further, a range of the part protruded outside from the stator core 7, to which the adhesive member 30 is applied or attached, is a range in which partial discharge does not occur in the main insulating layer 201 and can be appropriately set in accordance with the configuration of the rotating electrical machine.

Figure 8:
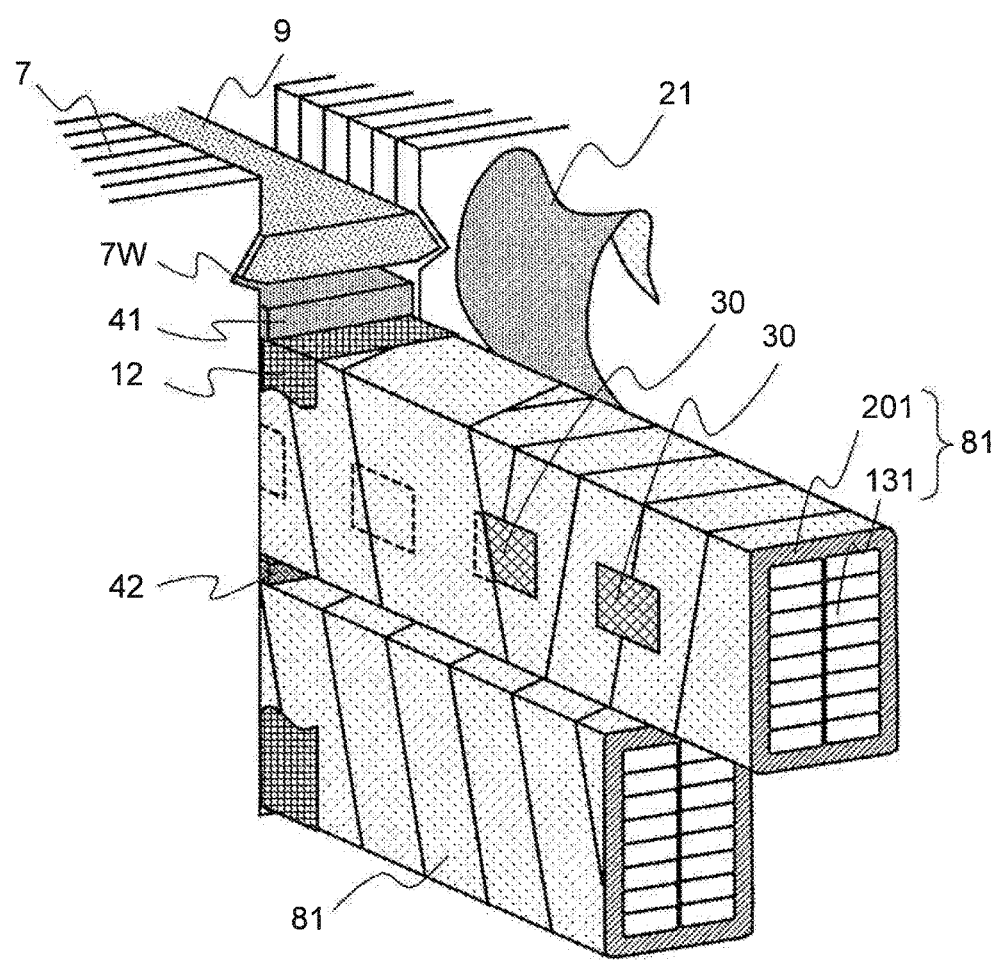
FIG. 8 is a schematic perspective view of and around an exit portion of a stator core receiving the stator coil in Example 2.

FIG. 8 is a schematic perspective view of and around the exit portion of the stator core 7 of the rotating electrical machine receiving the stator coil 81 in this example.

In FIG. 8, a part of the insulation protective layer 12 of the stator coil 81 is illustrated to be cut out. Further, the stator coil 81 illustrated in FIG. 8 is different from an actual device in that the insulating tape 21 is being wound.

A configuration of the stator core 7 of the rotating electrical machine receiving the stator coil 81 in this example illustrated in FIG. 8 and an assembly procedure of the stator coil 81 in this example are the same as those in Example 1 illustrated in FIG. 5, and therefore description thereof is omitted herein.

By applying the stator coil 81 to which this example is applied, impregnation with the insulating resin and curing of the insulating resin are performed while the bulge of the main insulating layer 20 of the stator coil 81 at the exit portion of the stator core 7 is being suppressed. Therefore, it is possible to provide a rotating electrical machine having high insulation reliability.

The adhesive members 30 are discontinuously applied or attached in this example, which is different from Example 1 where the adhesive member 30 is continuously applied or attached. This makes it possible to reduce a use amount of the adhesive member 30.

Example 3

Another example of the configuration of the stator coil 8 will be described with reference to FIG. 9 to FIG. 11. Note that, in FIG. 9 to FIG. 11, the same reference signs as those in FIG. 1 to FIG. 8 denote the same components, and therefore repeated description thereof is omitted in some cases.

In Example 1 described above, the following example has been described: the adhesive member 30 is continuously applied or attached in the longitudinal direction of the coil to the outer circumference of the insulating tape that has already been wound to adhere the outer circumference to the inner circumference of the wound insulating tape 21. In Example 2, the following example has been described: the adhesive members 30 are discontinuously applied or attached in the longitudinal direction of the coil to adhere to the inner circumference of the wound insulating tape 21. In this example, in the case where the insulating tape 21 is wound so that about a half of the tape width is overlapped, the adhesive members 30 are inserted into overlapped parts of the tape.

That is, in Examples 1 and 2 described above, the layers of the main insulating layer 20 formed by winding the insulating tape 21 are adhered to each other with the use of the adhesive member 30, whereas, in this example, the adhesive members 30 are provided inside a layer of the main insulating layer 20 formed by winding the insulating tape 21.

Description will be made in detail below with reference to the drawings.

Figure 9:
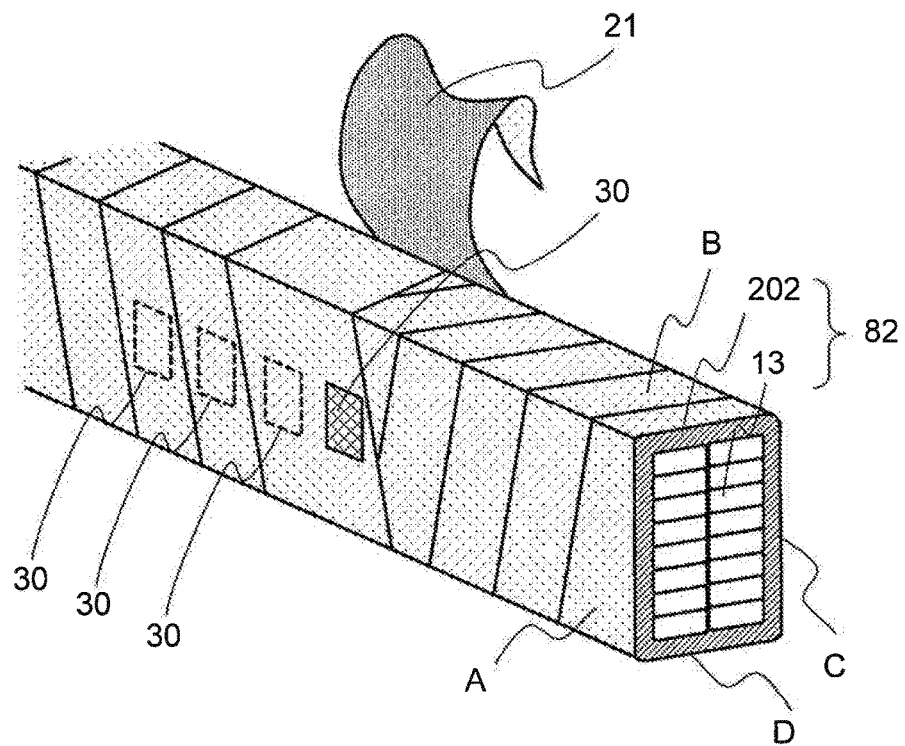
FIG. 9 is a schematic perspective view illustrating progress in which a stator coil in Example 3 is taped with an insulating tape.

FIG. 9 is a schematic perspective view illustrating progress in which a stator coil 82 is taped with the insulating tape 21. The stator coil 82 is formed by gathering the plurality of coil conductors 13 and winding the insulating tape 21 around the outer circumference thereof so that about a half of a tape width is overlapped. This process is repeated a plurality of times, and a plurality of layers in which the insulating tape 21 is wound are formed. Thus, a main insulating layer 202 is formed.

At this time, as illustrated in FIG. 9, the adhesive members 30 are applied or attached to the overlapped parts of the insulating tape 21 wound to be overlapped. The adhesive members 30 can be an arbitrary adhesive member such as a liquid, gel, semisolid, or solid adhesive member.

Intervals at which the adhesive members 30 are applied or attached and areas of the adhesive members 30 are appropriately adjusted in accordance with a bulge amount of the main insulating layer 202. That is, in the case where the bulge amount caused by loose winding of the insulating tape 21 is large, the intervals of the adhesive members 30 are reduced, or the areas of the adhesive members 30 are increased.

Further, as in Examples 1 and 2, a surface to which the adhesive members 30 are applied or attached can be selected in accordance with an area of a side surface of the main insulating layer 202. FIG. 9 illustrates an example where the adhesive members 30 are applied or attached to an A surface of the stator coil 82 in which loose winding of the insulating tape 21 easily occurs. However, the adhesive members 30 may be applied or attached to a C surface. Further, the adhesive members 30 may be applied or attached to both the A surface and the C surface. Moreover, a bulge of the main insulating layer 202 caused by loose winding of the insulating tape 21 may be further suppressed by applying or attaching the adhesive members 30 to all of A, B, C, and D surfaces of the stator coil 82 and adhering the layers of the insulating tape 21.

Figure 10:
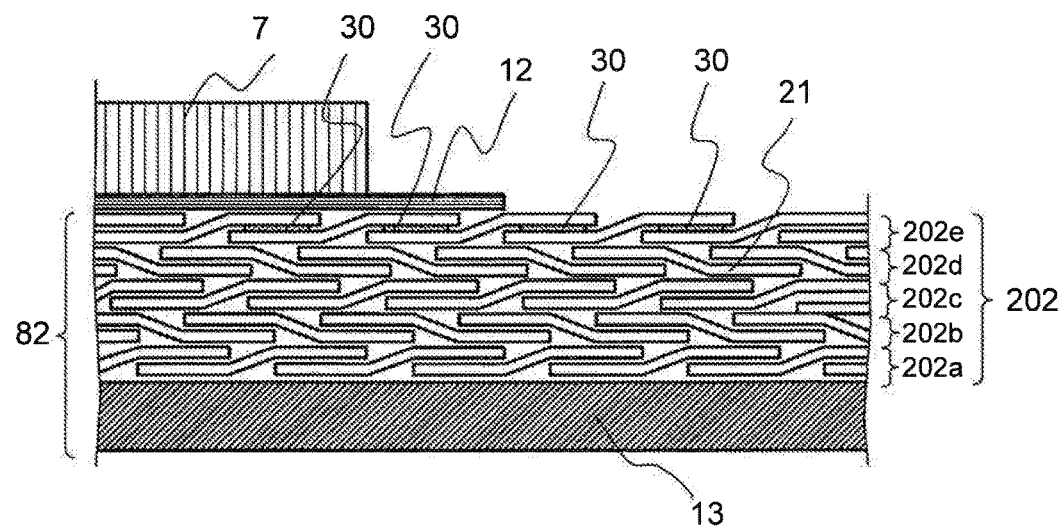
FIG. 10 illustrates a cross section in a longitudinal direction of the stator coil having a main insulating layer in Example 3.

FIG. 10 illustrates a cross section in a longitudinal direction of the stator coil 82 having the main insulating layer 202, which is obtained in the case where the stator coil 82 is received in the slot 7G of the stator core 7.

The main insulating layer 202 is formed by the insulating tape 21 such as a mica tape wound around the outer circumference of the coil conductors 13. Specifically, the main insulating layer 202 having five layers of a main insulating layer 202a, a main insulating layer 202b, a main insulating layer 202c, a main insulating layer 202d, and a main insulating layer 202e is formed by winding the insulating tape 21 five times in the same way as Examples 1 and 2.

In the main insulating layer 202e, the adhesive member 30 is applied or attached to adhere the overlapped part of the insulating tape 21 wound to be overlapped, and thus the main insulating layer 202e is formed.

At this time, the adhesive member 30 is applied or attached to at least a part of the stator coil 82 protruded from the stator core 7.

With this, a bulge caused by loose winding of the insulating tape 21 is not generated in the main insulating layer 202 of the stator coil 82 that is not restricted by the slot 7G of the stator core 7.

FIG. 10 illustrates the case where the adhesive members 30 are continuously applied or attached to every overlapped part of the insulating tape 21 wound to be overlapped. However, the adhesive members 30 may be applied or attached at intervals, i.e., for example, to every other overlapped part.

In this example, because the overlapped part of the insulating tape 21 of the main insulating layer 202 formed by winding the insulating tape 21 a plurality of times is adhered, the winding strength of the insulating tape 21 can be larger than those in other examples. With this, a bulge of the stator coil 82 caused by loose winding of the insulating tape 21 is not generated.

The above examples are applicable to the case where the insulating tape 21 is wound a plurality of times (the case where a plurality of main insulating layers are formed). However, this example is also applicable to the case where the insulating tape 21 is wound once.

Herein, a production method of the stator coil 82 illustrated in FIG. 9 will be described.

The stator coil 82 is formed by gathering the plurality of coil conductors 13 and then the insulating tape 21 is wound around the stator coil 82 a predetermined number of times (to form four layers in FIG. 9) with the use of a taping machine. Then, in the case where the next insulating tape 21 is wound, the adhesive member 30 is applied or attached to each overlapped part of the insulating tape 21 wound to be overlapped by using a tool, and the insulating tape 21 is wound around the adhesive members 30. Thus, the main insulating layer 202 is formed.

At this time, the application or attachment range of the adhesive member 30 may include not only the part protruded from the stator core 7 when the stator coil 82 is received in the slot 7G of the stator core 7 but also the outer circumference side of the insulating tape 21 corresponding to a part received in the slot 7G of the stator core 7.

Further, a range of the part protruded from the stator core 7, to which the adhesive member 30 is applied or attached, is a range in which partial discharge does not occur in the main insulating layer 202 and can be appropriately set in accordance with the configuration of the rotating electrical machine.

Figure 11:
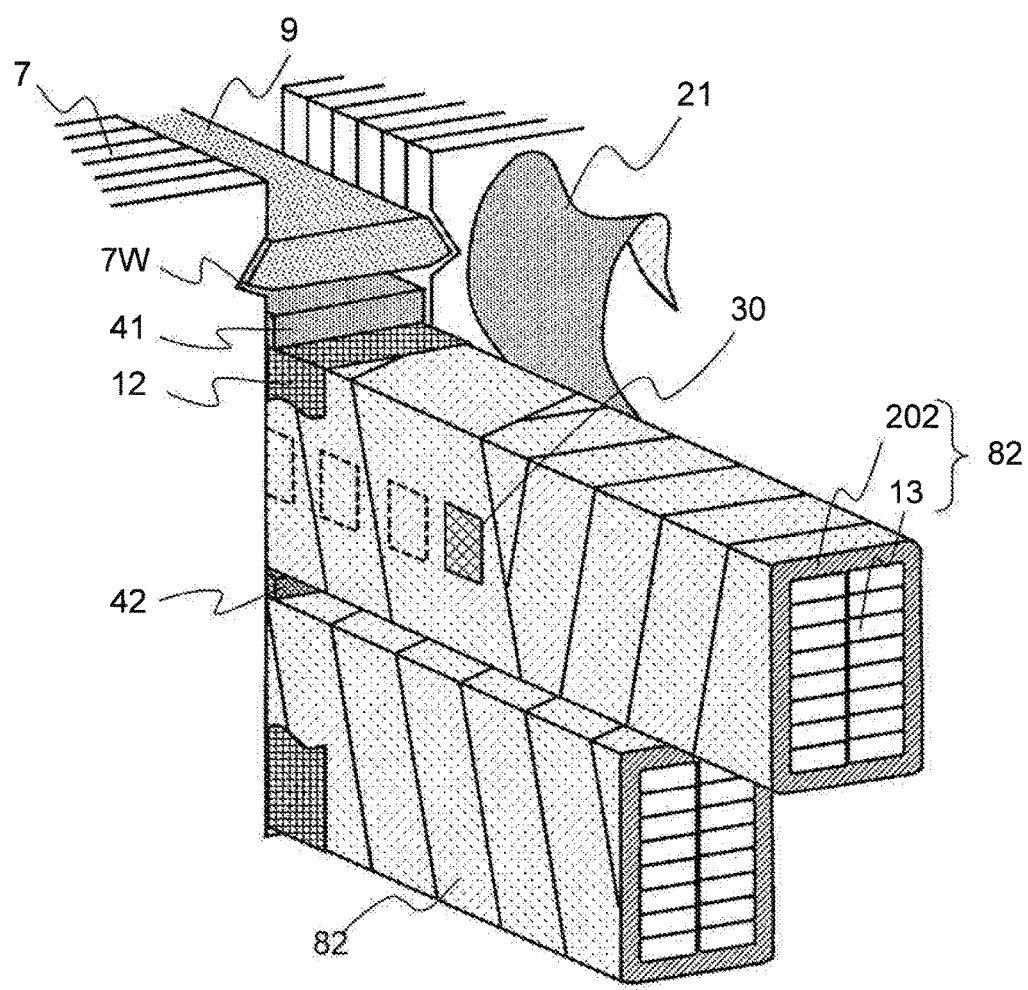
FIG. 11 is a schematic perspective view of and around an exit portion of a stator core receiving the stator coil in Example 3.

FIG. 11 is a schematic perspective view of and around the exit portion of the stator core 7 of the rotating electrical machine receiving the stator coil 82 in this example.

In FIG. 11, a part of the insulation protective layer 12 of the stator coil 82 is illustrated to be cut out. Further, the stator coil 82 illustrated in FIG. 11 is different from an actual device in that the insulating tape 21 is being wound.

A configuration of the stator core 7 of the rotating electrical machine receiving the stator coil 82 in this example illustrated in FIG. 11 and an assembly procedure of the stator coil 82 in the example are the same as those in Example 1 illustrated in FIG. 5, and therefore description thereof is omitted herein.

By applying the stator coil 82 to which this example is applied, impregnation with the insulating resin and curing of the insulating resin are performed while the bulge of the main insulating layer 202 of the stator coil 82 at the exit portion of the stator core 7 is being suppressed. Therefore, it is possible to provide a rotating electrical machine having high insulation reliability.

In this example, the overlapped part of the insulating tape 21 wound to be partially overlapped is adhered, and therefore it is possible to provide adhesion on a side closer to the outer circumference of the main insulating layer 202, as compared with Embodiments 1 and 2. Accordingly, a bulge of the main insulating layer 202 can be suppressed further effectively. Further, this example is also applicable to the case where the main insulating layer is formed by winding the insulating tape 21 once.

Example 4

Another example of the configuration of the stator coil 8 will be described with reference to FIG. 12 to FIG. 14. Note that, in FIG. 12 to FIG. 14, the same reference signs as those in FIG. 1 to FIG. 11 denote the same components, and therefore repeated description thereof is omitted in some cases.

In Examples 1 to 3 described above, the adhesive member 30 is applied or attached to the outer circumference of the insulating tape 21 that has already been wound, and then the insulating tape 21 is wound around the adhesive member 30 to be adhered thereto. This example is different from Examples 1 to 3 in that the adhesive member 30 having a predetermined length is applied or attached to the inner circumference of the insulating tape to be wound and is wound and adhered to be partially overlapped on the insulating tape that has already been wound.

Description will be made in detail below with reference to the drawings.

Figure 12:
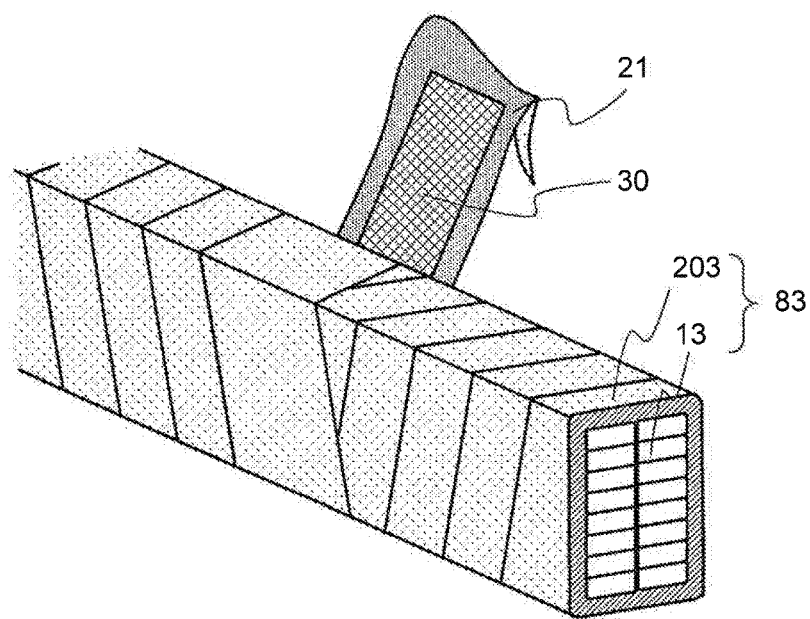
FIG. 12 is a schematic perspective view illustrating progress in which a stator coil in Example 4 is taped with an insulating tape.

FIG. 12 is a schematic perspective view of a stator coil 83 in this example, illustrating progress in which the stator coil 83 is taped with the insulating tape 21. The stator coil 83 is formed by gathering the plurality of coil conductors 13 and winding the insulating tape 21 around the outer circumference thereof so that about a half of a tape width is overlapped. This process is repeated a plurality of times, and a plurality of layers in which the insulating tape 21 is wound are formed. Thus, a main insulating layer 203 is formed.

In the case where the insulating tape 21 in an outermost circumference is wound, the insulating tape 21 to which the adhesive member 30 is continuously applied or attached to inside of the insulating tape 21 in a length direction thereof is wound around the stator coil 83 to be overlapped.

The adhesive member 30 can be an arbitrary adhesive member such as a liquid, gel, semisolid, or solid adhesive member.

Figure 13:
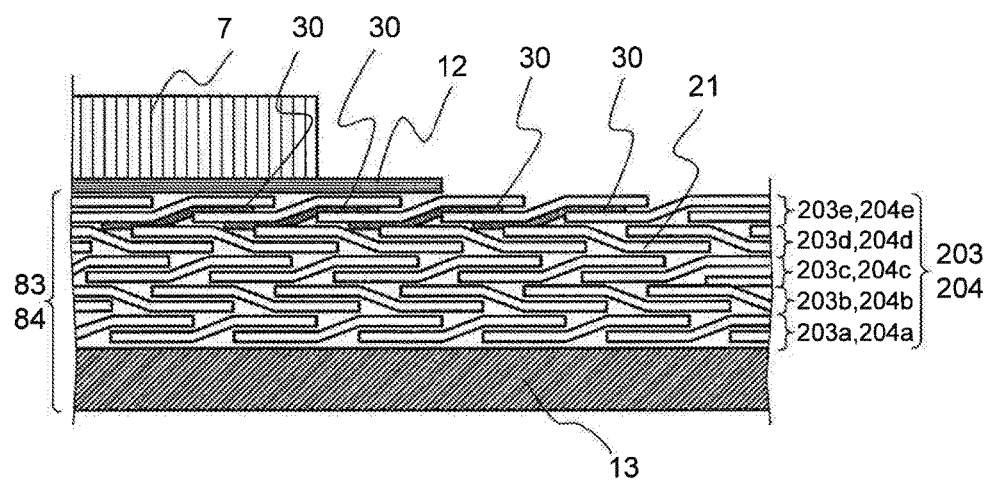
FIG. 13 illustrates a cross section in a longitudinal direction of the stator coil having a main insulating layer in Example 4.

FIG. 13 illustrates a cross section in a longitudinal direction of the stator coil 83 having the main insulating layer 203, which is obtained in the case where the stator coil 83 is received in the slot 7G of the stator core 7. Note that FIG. 13 is also referred to in Example 5 described below, and therefore reference signs in Example 5 are also written.

The main insulating layer 203 is formed by the insulating tape 21 such as a mica tape wound around the outer circumference of the coil conductors 13. Specifically, the main insulating layer 203 having five layers of a main insulating layer 203a, a main insulating layer 203b, a main insulating layer 203c, a main insulating layer 203d, and a main insulating layer 203e is formed by winding the insulating tape 21 five times.

The main insulating layer 203e is formed by winding the insulating tape 21 to which the adhesive member 30 is continuously applied or attached in a longitudinal direction within a predetermined range on the inside of the insulating tape 21. Therefore, an overlapped part of the insulating tape 21 is adhered by the adhesive member 30. Further, the main insulating layer 203e is also adhered by the adhesive member 30 to the main insulating layer 203d in which the insulating tape 21 has already been wound.

Specifically, the width of adhesion of the overlapped part and the width of adhesion to the main insulating layer 203d can be adjusted on the basis of a position and a width of the adhesive member 30 in a width direction of the insulating tape 21.

At this time, the adhesive member 30 is applied or attached to at least a part of the stator coil 83 protruded from the stator core 7.

With this, a bulge caused by loose winding of the insulating tape 21 is not generated in the main insulating layer 203 of the stator coil 83 that is not restricted by the slot 7G of the stator core 7.

As described above, in this example, the adhesive member 30 is applied or attached to the insulating tape 21 forming the main insulating layer 203 in the outermost circumference.

With this, in the case where the insulating tape 21 is wound around the stator coil 83, both the overlapped part of the insulating tape 21 and the main insulating layer 203 to which the insulating tape 21 has already been wound are adhered to each other. Therefore, a bulge caused by the insulating tape 21 of the main insulating layer 203 can be prevented more strongly.

Herein, a production method of the stator coil 83 illustrated in FIG. 12 will be described.

The stator coil 83 is formed by gathering the plurality of coil conductors 13 and then the insulating tape 21 is wound around the stator coil 83 a predetermined number of times (to form four layers in FIG. 12) with the use of a taping machine. Then, a tool for applying or attaching the adhesive member 30 is provided to a supply unit of the insulating tape 21. Thereafter, the adhesive member 30 is applied or attached to the inside of the insulating tape 21 in the longitudinal direction and the insulating tape 21 is wound around the stator coil 83. Thus, the main insulating layer 203 is formed.

At this time, the tool for applying or attaching the adhesive member 30 applies or attaches the adhesive member 30 to the insulating tape 21 so that the application or attachment range of the adhesive member 30 is a part protruded from the stator core 7 in the case where the stator coil 83 is received in the stator core 7. The adhesive member 30 may also be applied or attached to the insulating tape 21 so that the application or attachment range of the adhesive member 30 includes a part received in the slot 7G of the stator core 7.

Herein, a range of the part protruded outside from the stator core 7, to which the adhesive member 30 is applied or attached, is a range in which partial discharge does not occur in the main insulating layer 203 and can be appropriately set in accordance with the configuration of the rotating electrical machine.

The adhesive member 30 is applied or attached in advance to the insulating tape 21 forming the main insulating layer 203 in the outermost circumference, and the insulating tape 21 may be exchanged when taping is performed in the outermost circumference of the main insulating layer 203.

Figure 14:
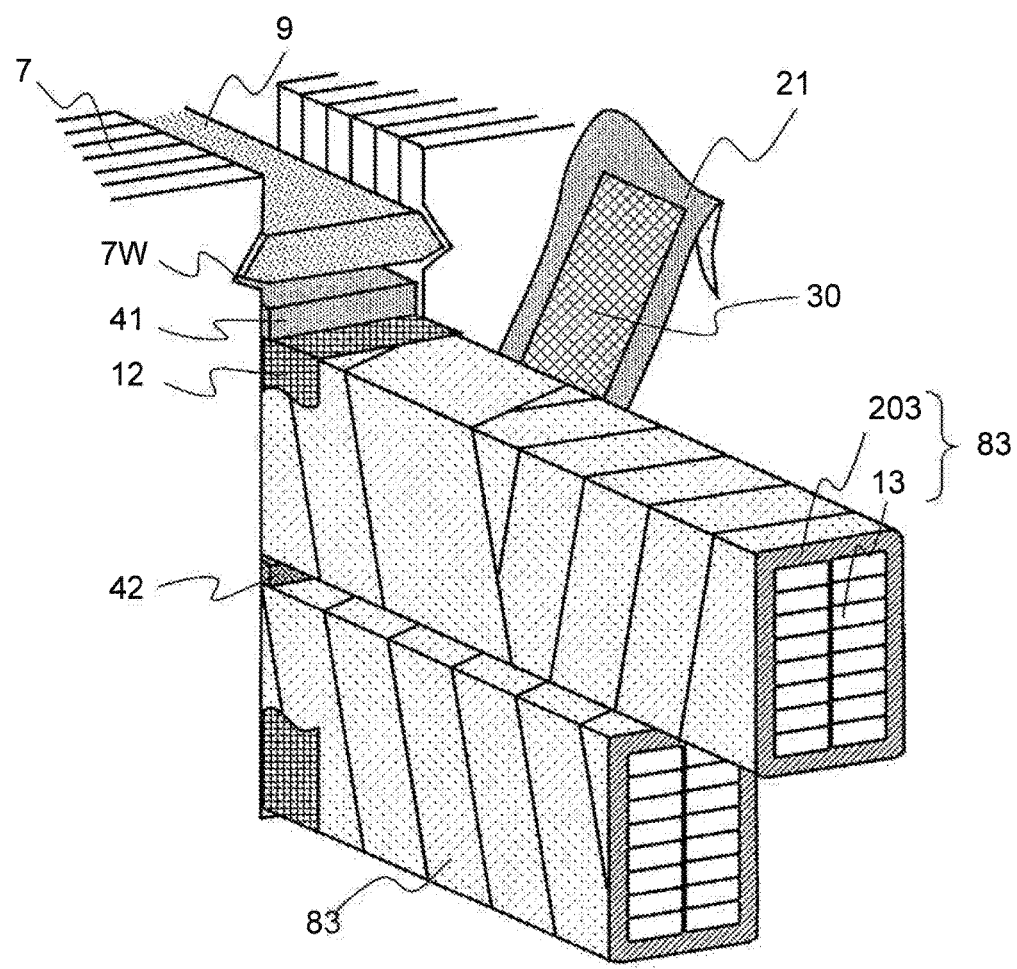
FIG. 14 is a schematic perspective view of and around an exit portion of a stator core receiving the stator coil in Example 4.

FIG. 14 is a schematic perspective view of and around the exit portion of the stator core 7 of the rotating electrical machine receiving the stator coil 83 in this example.

In FIG. 14, a part of the insulation protective layer 12 of the stator coil 83 is illustrated to be cut out. Further, the stator coil 83 illustrated in FIG. 14 is different from an actual device in that the insulating tape 21 is being wound.

A configuration of the stator core 7 of the rotating electrical machine receiving the stator coil 83 in this example illustrated in FIG. 14 and an assembly procedure of the stator coil 83 in the example are the same as those in Example 1 illustrated in FIG. 5, and therefore description thereof is omitted herein.

By applying the stator coil 83 to which this example is applied, impregnation with the insulating resin and curing of the insulating resin are performed while the bulge caused by loose winding of the insulating tape 21 of the main insulating layer 203 of the stator coil 83 at the exit portion of the stator core 7 is being suppressed. Therefore, it is possible to provide a rotating electrical machine having high insulation reliability.

In this example, both the overlapped part of the wound insulating tape 21 and the main insulating layer in which the insulating tape 21 has already been wound are adhered to each other, and therefore the main insulating layer 203 can be formed more strongly, and a bulge caused by loose winding of the insulating tape 21 of the main insulating layer 203 can be suppressed further effectively.

Further, adhesion is provided over a whole circumference of the stator coil 83 in the circumferential direction thereof, and therefore a bulge of the main insulating layer 203 can be uniformly prevented in the circumferential direction, as compared with Examples 1 and 2.

Example 5

Another example of the configuration of the stator coil 8 will be described with reference to FIG. 15 to FIG. 16. Note that, in FIG. 15 to FIG. 16, the same reference signs as those in FIG. 1 to FIG. 14 denote the same components, and therefore repeated description thereof is omitted in some cases.

This example is different from Example 4 in that a main insulating layer 204 is formed by discontinuously applying or attaching the adhesive members 30 having a predetermined length in a tape length direction of the insulating tape 21.

Figure 15:
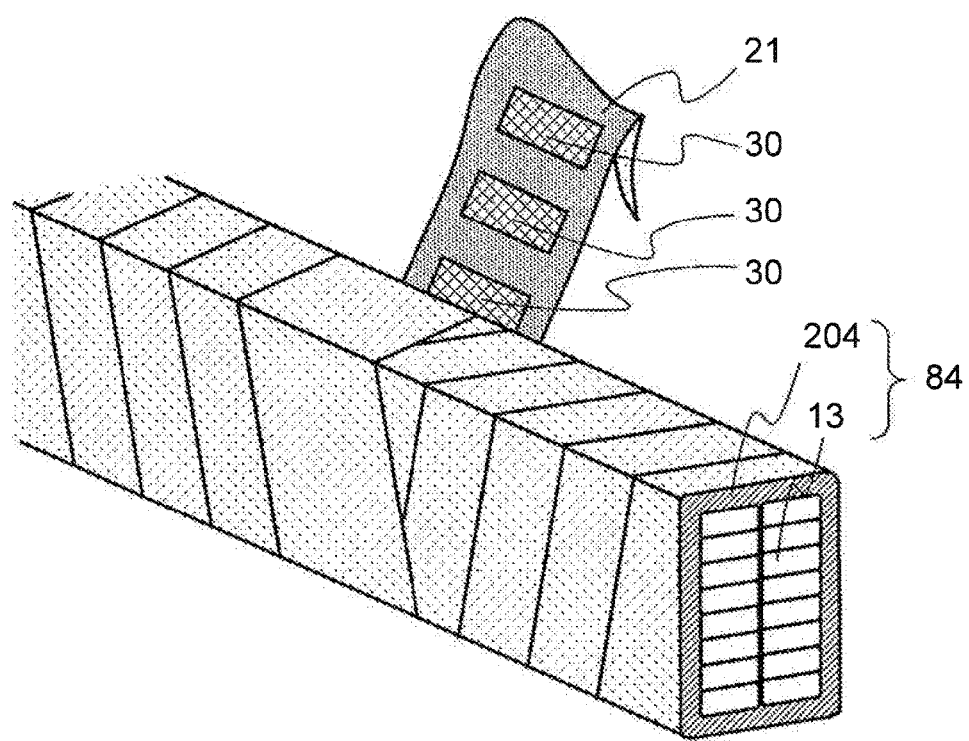
FIG. 15 is a schematic perspective view illustrating progress in which a stator coil in Example 5 is taped with an insulating tape.

FIG. 15 is a schematic perspective view of a stator coil 84 in this example, illustrating progress in which the stator coil 84 is taped with the insulating tape 21. The stator coil 84 is formed by gathering the plurality of coil conductors 13 and winding the insulating tape 21 around the outer circumference thereof so that about a half of a tape width is overlapped. This process is repeated a plurality of times, and a plurality of layers in which the insulating tape 21 is wound are formed. Thus, a main insulating layer 204 is formed.

At this time, the insulating tape 21 to which the adhesive members 30 having a predetermined length are discontinuously applied or attached in a length direction thereof is wound around the stator coil 84 to be overlapped.

The adhesive member 30 can be an arbitrary adhesive member such as a liquid, gel, semisolid, or solid adhesive member.

A cross section of the stator coil 84 of the main insulating layer 204 in the longitudinal direction is the same as that in FIG. 13 illustrating Example 4.

The main insulating layer 204 is formed by the insulating tape 21 such as a mica tape wound around the outer circumference of the coil conductors 13. Specifically, the main insulating layer 204 having five layers of a main insulating layer 204a, a main insulating layer 204b, a main insulating layer 204c, a main insulating layer 204d, and a main insulating layer 204e is formed by winding the insulating tape 21 five times.

The main insulating layer 204e is formed by winding the insulating tape 21 to which the adhesive members 30 having a predetermined length are discontinuously applied or attached in the longitudinal direction. As in Example 4, an overlapped part of the insulating tape 21 is adhered by the adhesive member 30. Further, the main insulating layer 204e is also adhered by the adhesive member 30 to the main insulating layer 204d in which the insulating tape 21 has already been wound.

Specifically, the width of adhesion of the overlapped part and the width of adhesion to the main insulating layer 204d can be adjusted on the basis of a position and a width of the adhesive member 30 in the width direction of the insulating tape 21.

Further, the adhesive member 30 is applied or attached to at least a part of the stator coil 84 protruded from the stator core 7.

With this, a bulge is not generated in the main insulating layer 204 of the stator coil 84 that is not restricted by the slot 7G of the stator core 7.

The adhesive member 30 may also be applied or attached to the insulating tape 21 so that the application or attachment range of the adhesive member 30 includes a part received in the slot 7G of the stator core 7.

Intervals at which the adhesive members 30 having a predetermined length are discontinuously applied or attached in the longitudinal direction and the length of the adhesive members 30 in the longitudinal direction are appropriately adjusted in accordance with a bulge amount caused by loose winding of the insulating tape 21 of the main insulating layer 204. That is, in the case where the bulge amount is large, the intervals of the adhesive members 30 are reduced, or the areas of the adhesive members 30 are increased.

Further, when the interval of the adhesive members 30 is set to be a winding length in an outer circumference of the main insulating layer 204, it is possible to obtain a similar effect to that obtained in the case where the adhesive member 30 is applied or attached in the longitudinal direction of the stator coil 84 in the same way as Examples 1 and 2.

As described above, in this example, the adhesive member 30 is applied or attached to the inside of the insulating tape 21 forming the main insulating layer 204 in the outermost circumference. With this, in the case where the insulating tape 21 is wound around the stator coil 84, both the overlapped part of the insulating tape 21 and the main insulating layer 204 to which the insulating tape 21 has already been wound are adhered to each other. Therefore, a bulge caused by loose winding of the insulating tape 21 of the main insulating layer 204 can be prevented more strongly.

Further, it is possible to adjust an area in which the adhesive member 30 is applied or attached in accordance with a necessary adhesive strength, and therefore an amount of the adhesive member 30 can be reduced and cost reduction can be achieved, as compared with Example 4.

As described above, the stator coil 84 in this example is different from the stator coil 83 in Example 4 in a shape of the adhesive member 30 applied or attached to the insulating tape 21. Therefore, the stator coil 84 of this example can be produced in the same way as the production method described in Example 4.

Figure 16:
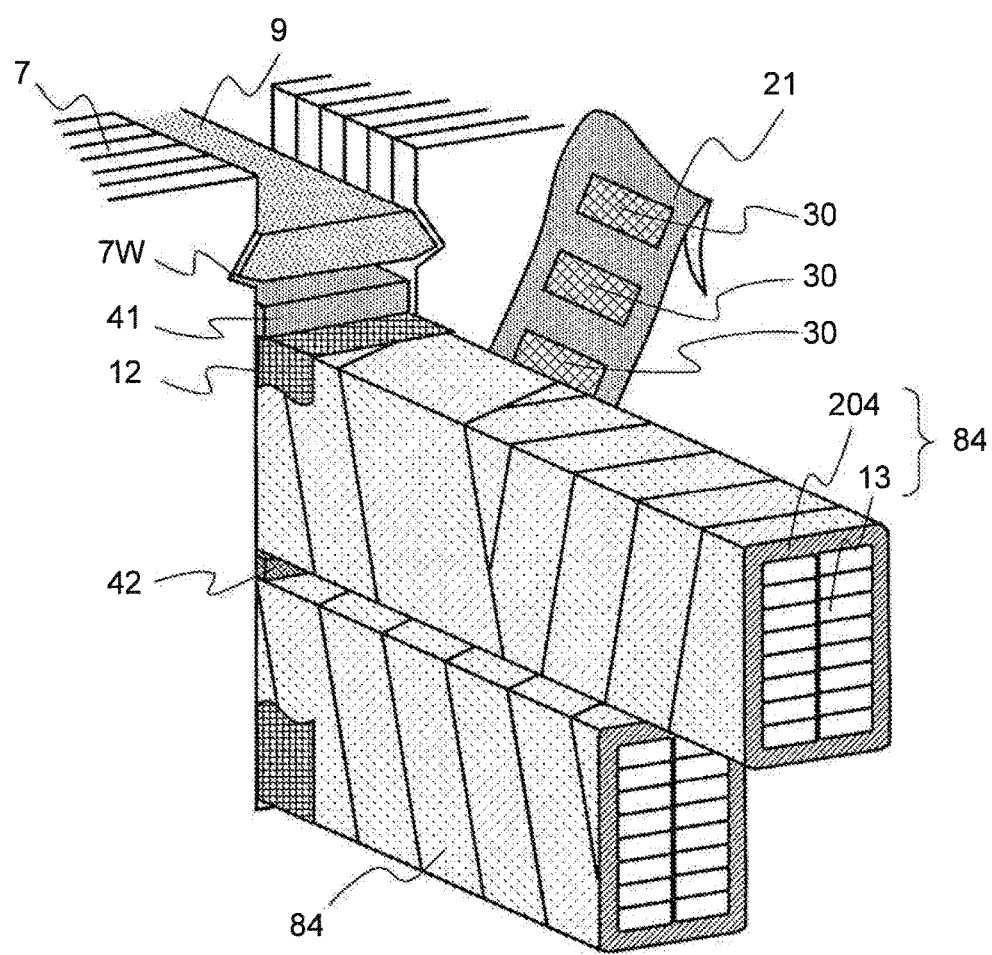
FIG. 16 is a schematic perspective view of and around an exit portion of a stator core receiving the stator coil in Example 5.

FIG. 16 is a schematic perspective view of and around the exit portion of the stator core 7 of the rotating electrical machine receiving the stator coil 84 in this example.

In FIG. 16, a part of the insulation protective layer 12 of the stator coil 84 is illustrated to be cut out. Further, the stator coil 84 illustrated in FIG. 16 is different from an actual device in that the insulating tape 21 is being wound.

A configuration of the stator core 7 of the rotating electrical machine receiving the stator coil 84 in this example illustrated in FIG. 16 and an assembly procedure of the stator coil 84 in the example are the same as those in Example 1 illustrated in FIG. 5, and therefore description thereof is omitted herein.

By applying the stator coil 84 to which this example is applied, impregnation with the insulating resin and curing of the insulating resin are performed while the bulge of the main insulating layer 204 of the stator coil 84 at the exit portion of the stator core 7 is being suppressed. Therefore, it is possible to provide a rotating electrical machine having high insulation reliability.

In this example, both the overlapped part formed by winding the wound insulating tape 21 and the main insulating layer 204 in which the insulating tape 21 has already been wound are adhered to each other, and therefore the main insulating layer 204 can be formed more strongly, and the use amount of the adhesive member 30 can be reduced, as compared with Example 4. With this, the bulge of the main insulating layer 204 can be suppressed further effectively.

The invention is not limited to the above examples and includes various modification examples. For example, the above examples have been described in detail to easily understand the invention, and therefore the invention is not necessarily limited to the examples having all the configurations described above. Further, a part of a configuration of a certain embodiment can be replaced with a configuration of another embodiment, and a configuration of another embodiment can also be added to a configuration of a certain embodiment.

REFERENCE SIGNS LIST 7 stator core
8 stator coil
12 insulation protective layer
13 coil conductor
20 main insulating layer
21 insulating tape
30 adhesive member

What is claimed is:

1. A rotating electrical machine coil provided by receiving the rotating electrical machine coil in a core of a rotating electrical machine and performing impregnation with insulating resin and curing of the insulating resin, comprising:
   a plurality of coil conductors; and
   an insulating tape wound around the coil conductors a plurality of times to form an insulating layer, wherein
      the insulating layer corresponding to at least a part of the coil conductors protruded from the core is provided so that a part of the wound insulating tape is adhered,
      the insulating tape is adhered directly to an outer circumference side of the insulating layer, and
      the insulating tape is adhered between layers of the wound insulating tape.

2. The rotating electrical machine coil according to claim 1, wherein the insulating tape is adhered at an overlapped part of the wound insulating tape.

3. The rotating electrical machine coil according to claim 2, wherein
an adhesive member is provided to inside of the winding insulating tape.

4. The rotating electrical machine coil according to claim 1, wherein
in the insulating layer corresponding to at least the part of the coil conductors protruded from the core, the insulating tape is continuously adhered in a longitudinal direction of the coil.

5. The rotating electrical machine coil according to claim 1, wherein
in the insulating layer corresponding to at least the part of the coil conductors protruded from the core, the insulating tape is discontinuously adhered in a longitudinal direction of the coil.

6. The rotating electrical machine coil according to claim 5, wherein
the insulating tape is discontinuously adhered to have a pitch equal to a winding pitch in a longitudinal direction of the insulating tape.

7. The rotating electrical machine coil according to claim 1, wherein
in the insulating layer corresponding to at least the part of the coil conductors protruded from the core, the insulating tape is adhered on a side surface having the largest area in a circumferential direction.

8. A rotating electrical machine, comprising:
the rotating electrical machine coil according to claim 1; and
a rotating electrical machine core in which the rotating electrical machine coil is received, wherein
the rotating electrical machine coil and the rotating electrical machine core are impregnated with resin.

* * * * *